(12) United States Patent
Tominaga et al.

(10) Patent No.: US 11,462,179 B2
(45) Date of Patent: Oct. 4, 2022

(54) LIQUID CRYSTAL DISPLAY DEVICE

(71) Applicant: SHARP KABUSHIKI KAISHA, Sakai (JP)

(72) Inventors: Masakatsu Tominaga, Sakai (JP); Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/466,627

(22) Filed: Sep. 3, 2021

(65) Prior Publication Data

US 2022/0076641 A1 Mar. 10, 2022

(30) Foreign Application Priority Data

Sep. 8, 2020 (JP) .............................. JP2020-150751

(51) Int. Cl.
*G09G 3/34* (2006.01)
*G02F 1/1347* (2006.01)
*G09G 3/36* (2006.01)
*G02F 1/1335* (2006.01)

(52) U.S. Cl.
CPC ....... *G09G 3/3413* (2013.01); *G02F 1/13476* (2013.01); *G02F 1/133514* (2013.01); *G02F 1/133528* (2013.01); *G02F 1/133622* (2021.01); *G09G 3/3607* (2013.01); *G09G 3/3648* (2013.01); *G09G 2300/023* (2013.01); *G09G 2310/0235* (2013.01); *G09G 2320/0252* (2013.01)

(58) Field of Classification Search
CPC .. G09G 3/3413; G09G 3/3607; G09G 3/3648; G09G 2300/023; G09G 2310/0235; G09G 2320/0252; G02F 1/133622; G02F 1/133514; G02F 1/133528; G02F 1/13476
See application file for complete search history.

(56) References Cited

U.S. PATENT DOCUMENTS

2017/0115527 A1 4/2017 Kita et al.

FOREIGN PATENT DOCUMENTS

WO 2015/190588 A1 12/2015

*Primary Examiner* — Chanh D Nguyen
*Assistant Examiner* — Ngan T. Pham-Lu
(74) *Attorney, Agent, or Firm* — ScienBiziP, P.C.

(57) ABSTRACT

A liquid crystal display device includes a first liquid crystal display panel of a field sequential type, a second liquid crystal display panel of a color filter type disposed on a back face side of the first liquid crystal display panel, and a backlight configured to emit white light on a back face side of the second liquid crystal display panel.

10 Claims, 14 Drawing Sheets

LIQUID CRYSTAL DISPLAY DEVICE

CROSS-REFERENCE TO RELATED APPLICATIONS

This application claims the benefit of priority to Japanese Patent Application Number 2020-150751 filed on Sep. 8, 2020. The entire contents of the above-identified application are hereby incorporated by reference.

BACKGROUND

Technical Field

The present disclosure relates to a liquid crystal display device.

In recent years, display devices equipped with see-through displays have been attracting attention. In a see-through display, since a background (a back face side of a display panel) is visible, it is possible to overlap and display information displayed on the display panel and the background.

As a display device equipped with a see-through display, a display device including a see-through display and a rear display disposed on a back face side of the see-through display is being developed. For example, a liquid crystal display panel is used for the see-through display and the rear display. In such a display device, since an object disposed between two liquid crystal display panels can be visually recognized and an image can be displayed on each of the two liquid crystal display panels, unique visual effects are achieved. For this reason, the present disclosure can be widely applied to an amusement device, a display window, a showcase, or the like.

For example, WO 2015/190588 discloses a display device using a field sequential liquid crystal display panel as a see-through display. In the field sequential display panel, color display is performed by switching the color of light emitted from a backlight to the liquid crystal display panel in a time division manner. For this reason, a color filter is unnecessary, and light utilization efficiency is improved.

SUMMARY

In the known display device using a field sequential liquid crystal display panel as a see-through display, it is necessary to provide a multi-color backlight capable of causing each color of R, G, and B (and optionally white) to be emitted in a time division manner in order to display a color image on the see-through display. For this reason, there is a problem in that the configuration of the backlight is complex.

In light of the foregoing, an object of the present disclosure is to provide a liquid crystal display device including a plurality of liquid crystal display panels including a liquid crystal display panel capable of see-through display, and with which the structure of a backlight can be simplified.

The present specification discloses a liquid crystal display device according to the following items.

Item 1

A liquid crystal display device including:

a first liquid crystal display panel of a field sequential type;

a second liquid crystal display panel of a color filter type disposed on a back face side of the first liquid crystal display panel; and a backlight configured to emit white light to a back face side of the second liquid crystal display panel;

wherein the first liquid crystal display panel includes a first display region in which a plurality of first pixels are arranged, each first pixel being configured to be capable of assuming a transparent display state in which at least some of light emitted from the second liquid crystal display panel is transmitted;

the second liquid crystal display panel includes:

a second display region in which a plurality of second pixels each including at least a first subpixel, a second subpixel, and a third subpixel are arranged; and a color filter including a first color layer disposed in the first subpixel of each second pixel and configured to transmit light of a first color, a second color layer disposed in the second subpixel and configured to transmit light of a second color, and a third color layer disposed in the third subpixel and configured to transmit light of a third color, the first liquid crystal display device is switchable between a first mode in which the first liquid crystal display panel performs display in a field sequential manner and a second mode in which the second liquid crystal display panel performs display in a color filter manner, in the first mode, the first liquid crystal display panel is configured to divide one frame period into a plurality of fields to display different colors for each field, the plurality of fields including at least a first field including a first writing period and a first color display period for displaying a first color image, a second field including a second writing period and a second color display period for displaying a second color image, and a third field including a third writing period and a third color display period for displaying a third color image, the backlight is switched between an ON state in which white light is emitted in the first color display period, the second color display period, and the third color display period, and an OFF state in which white light is not emitted in the first writing period, the second writing period, and the third writing period, and in the second pixels of at least some of the plurality of second pixels of the second liquid crystal display panel, writing is performed to the first subpixel, the second subpixel, and the third subpixel for each field such that a first color is displayed in the first color display period, a second color is displayed in the second color display period, and a third color is displayed in the third color display period, and thus, light of a first color, light of a second color, and light of a third color are incident sequentially on the first liquid crystal display panel from the second liquid crystal display panel in one frame period.

Item 2

The liquid crystal display device according to item 1, wherein, in the first mode, in each of the at least some of the plurality of second pixels of the at least some of the second liquid crystal display panel, the first subpixel, the second subpixel and the third subpixel are written such that, in the first color display period, the first subpixel is in a white display state and the second subpixel and the third subpixel are in a black display state, in the second color display period, the second subpixel is in a white display state and the first subpixel and the third subpixel are in a black display state, and in the third color display period, the third subpixel is in a white display state and the first subpixel and the second subpixel are in a black display state.

Item 3

The liquid crystal display device according to item 1 or 2, wherein in the first mode, a first color is displayed in the first color display period, a second color is displayed in the second color display period, and a third color is displayed in the third color display period on the entirety of the second display region of the second liquid crystal display panel.

Item 4

The liquid crystal display device according to any one of items 1 to 3, wherein, in the second mode, the first pixels in at least some of the plurality of first pixels in the first liquid crystal display panel are set to a transparent display state.

Item 5

The liquid crystal display device according to any one of items 1 to 4, wherein the first liquid crystal display panel does not include a color filter.

Item 6

The liquid crystal display device according to any one of items 1 to 5, wherein the first display region of the first liquid crystal display panel and the second display region of the second liquid crystal display panel at least partially overlap when viewed from a normal direction of the first liquid crystal display panel, and the backlight is disposed on a back face side of the second liquid crystal display panel.

Item 7

The liquid crystal display device according to any one of items 1 to 6, wherein the first liquid crystal display panel includes a first liquid crystal layer and a first polarization element disposed on the first liquid crystal layer on a viewer side;

the second liquid crystal display panel includes a second liquid crystal layer, and a second polarization element and a third polarization element disposed on the second liquid crystal layer on a viewer side and a back face side, respectively, and no other polarization element is provided between the first liquid crystal layer and the second polarization element.

Item 8

The liquid crystal display device according to any one of items 1 to 7, wherein an array pitch of the plurality of first pixels in the first liquid crystal display panel and an array pitch of the plurality of second pixels in the second liquid crystal display panel are the same.

Item 9

The liquid crystal display device according to item 8, wherein the second liquid crystal display panel is disposed near a back face side of the first liquid crystal display panel; and in the first mode, the second liquid crystal display panel functions as an active backlight for the first liquid crystal display panel.

Item 10

The liquid crystal display device according to any one of items 1 to 9, wherein any one of the first color, the second color and the third color is red, one of the other colors is green, and the remaining color is blue.

In accordance with embodiments of the present disclosure, there is provided a liquid crystal display device including a plurality of liquid crystal display panels including a liquid crystal display panel capable of see-through display, and which may further simplify a structure of a backlight.

BRIEF DESCRIPTION OF DRAWINGS

The disclosure will be described with reference to the accompanying drawings, wherein like numbers reference like elements.

DESCRIPTION OF EMBODIMENTS

First Embodiment

Figure 1:
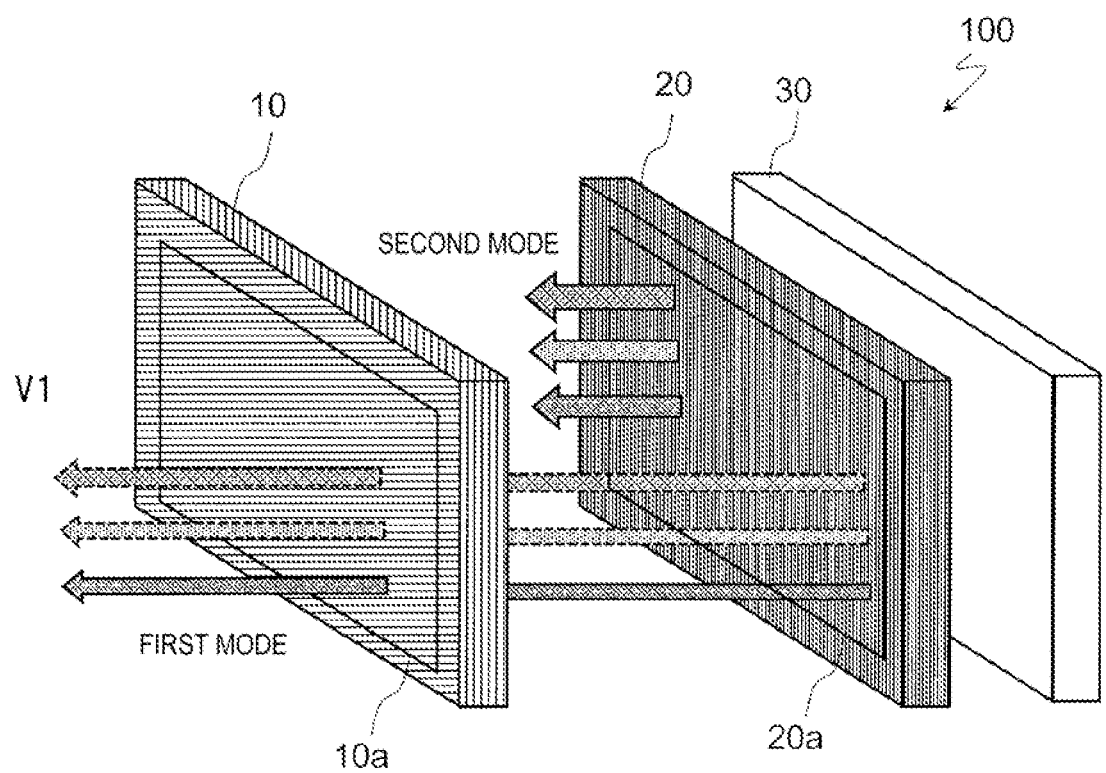
FIG. 1 is a view schematically illustrating a liquid crystal display device 100 according to a first embodiment.

FIG. 1 is a view schematically illustrating a configuration of a liquid crystal display device 100 according to a first embodiment.

The liquid crystal display device 100 includes a liquid crystal display panel (referred to as a "first liquid crystal display panel" or "front panel") 10 disposed on the side (front face side) of a viewer V1; a liquid crystal display panel (referred to as a "second liquid crystal display panel" or "rear panel") 20 disposed on the back face side of the front panel 10, and a backlight 30 that emits white light to the back face side of the rear panel 20.

The backlight 30 is disposed on the back face side of the rear panel 20, for example.

The front panel 10 and the rear panel 20 respectively have display regions 10a and 20a, each of which includes a plurality of pixels. When viewed from a front direction of the viewer V1 (for example, a normal direction of the front panel 10, which may be referred to as a "panel surface normal direction" below), the front panel 10 and the rear panel 20 are arranged such that these display regions 10a and 20a at least partially overlap. The front panel 10 and the rear panel 20 may be spaced apart from each other such that surfaces of these panels are parallel to each other.

The front panel 10 and the rear panel 20 are each capable of displaying a color image. In the present embodiment, the front panel 10 does not include a color filter, but is configured to perform color display in a field sequential manner in cooperation with a light source or the like disposed on the back face side of the front panel 10. The rear panel 20 is configured to perform color display in a color filter manner. In the field sequential manner, an image of the colors R, G and B, for example, is displayed in a time division manner in one frame period such that the viewer recognizes a mixed color image. On the other hand, in the color filter manner, one pixel is divided into subpixels of, for example, R, G and B, and the three colors of R, G and B are simultaneously displayed.

The front panel 10 may function as a see-through display capable of transmitting the background. The front panel 10 may assume a transparent display state in which at least some of the light emitted from the rear panel 20 is transmitted. When at least a part of the display region 10a of the front panel 10 is in the transparent display state, the viewer V1 can visually recognize the image displayed on the rear panel 20 and an object disposed between the front panel 10 and the rear panel 20.

Note that the front panel 10 can switch between the transparent display state and another display state (image display state) on a pixel-to-pixel basis. Accordingly, the background can be transmitted through only a part of the display region 10a. As a result, for example, the information displayed on the front panel 10 and the background can be displayed in a superposed manner.

The backlight 30 is configured to be capable of switching between an ON state in which white light is emitted to the rear panel 20 and an OFF state in which white light is not emitted, in a time division manner. The backlight 30 is, for example, a white backlight that emits white light.

The liquid crystal display device 100 includes a first mode in which the front panel 10 is capable of performing display in a field sequential manner and a second mode in which the rear panel 20 can perform display in a color filter manner. The first mode and the second mode are switchable.

In the first mode, the backlight 30 causes white light to blink a plurality of times during one frame period. The rear panel 20 synchronizes with the backlight 30 to cause the front panel 10 to sequentially perform incidence of different colors of light by displaying different colors in a time division manner. That is, the backlight 30 and the rear panel 20 cooperate to function as a multi-color backlight. In this way, a color image can be displayed on the front panel 10 in the field sequential manner.

On the other hand, in the second mode, white light from the backlight 30 is incident on the rear panel 20, and a color image is displayed on the rear panel 20 in a color filter manner. By setting a part or all of a surface of the display region 10a of the front panel 10 to the transparent display state, an image of the rear panel 20 can be visually recognized through the front panel 10. The operation of the liquid crystal display device 100 in each mode will be described below in detail.

In a display device in the related art, in a case where a field sequential liquid crystal display panel is used, there is a problem in that a multi-color backlight is required to be provided, which makes the configuration of the backlight complex. On the other hand, according to the present embodiment, the color display of the front panel 10 can be performed by sequentially displaying different colors on the rear panel 20 even when a backlight that can emit only white light is used. Accordingly, the backlight structure can be simplified further than in the related art.

Figure 2:
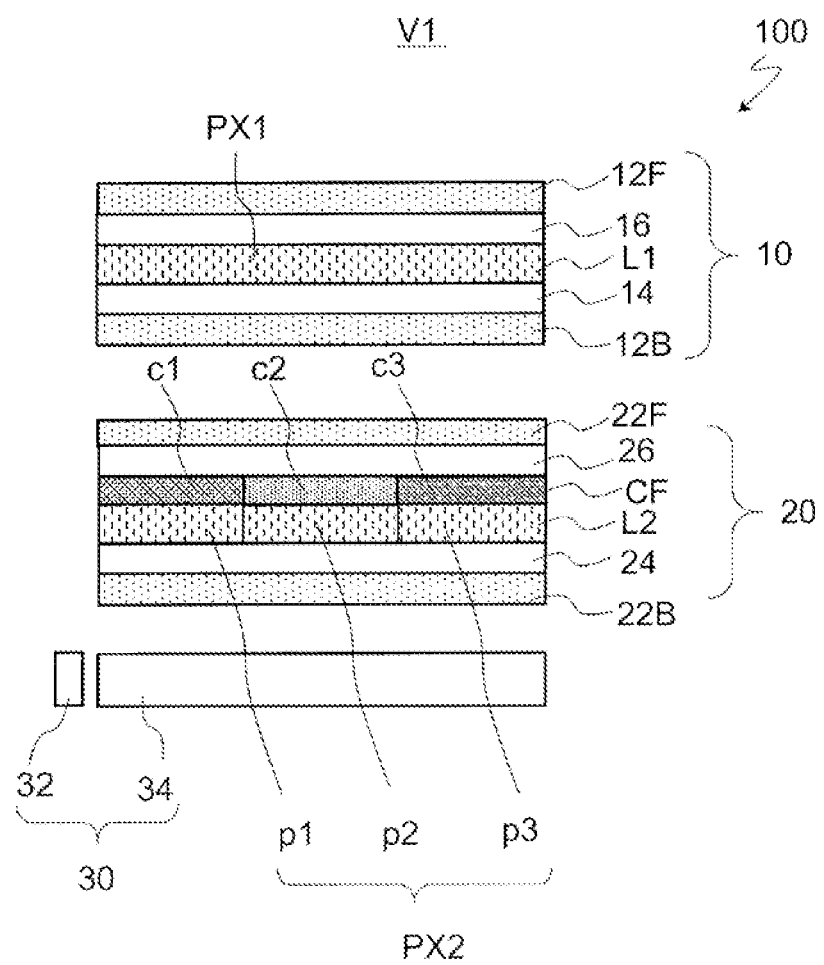
FIG. 2 is a cross-sectional view schematically illustrating an example of the liquid crystal display device 100.

FIG. 2 is a schematic cross-sectional view illustrating an example of the liquid crystal display device 100. The front panel 10 includes a plurality of first pixels PX1 arranged in a matrix. Similarly, the rear panel 20 includes a plurality of second pixels PX2 arranged in a matrix. FIG. 2 illustrates only a part of the front panel 10 corresponding to a single first pixel PX1 and a part of the rear panel 20 corresponding to a single second pixel PX2. In the following drawings, similarly, only the parts corresponding to the single pixels PX1 and PX2 may be shown.

In the example illustrated in FIG. 2, the first pixel PX1 of the front panel 10 and the second pixel PX2 of the rear panel 20 are disposed to match the panel surface normal direction, but these may not match. In addition, the array pitches of the pixels of the front panel 10 and the rear panel 20 are the same in this example, but they may be different from each other.

The front panel 10 includes a TFT substrate 14, a counter substrate 16, and a liquid crystal layer L1 held between the TFT substrate 14 and the counter substrate 16. The front panel 10 also includes a front face side polarizer 12F and a back face side polarizer 12B with the liquid crystal layer L1 interposed therebetween. The back face side polarizer 12B and the front face side polarizer 12F are, for example, disposed in a cross-Nicol alignment with the liquid crystal layer L1 interposed therebetween. In this example, the front face side polarizer 12F is disposed on the counter substrate 16 on the side of the viewer, and the back face side polarizer 12B is disposed on the TFT substrate 14 on the side of the back face.

Each of the first pixels PX1 of the front panel 10 exhibits a black display state indicating brightness corresponding to the lowest gray scale (gray scale at which the transmittance of light is minimal), and a white display state indicating brightness corresponding to the highest gray scale (gray scale at which the transmittance of light is maximal). In addition, the first pixel PX1 may be configured such that an "intermediate gray scale display state" indicating brightness corresponding to an intermediate gray scale can be exhibited. In the present embodiment, the same gray scale as the white display state may be allocated as the "transparent display state" described above. Note that the transparent display state may be a state in which the image of the object on the back face side of the front panel 10 or the image of the rear panel 20 is visible, and a gray scale different from the white display state may be allocated to the transparent display state.

The operation mode of the front panel 10 may be a vertical electrical field mode such as a twisted nematic (TN) mode, a vertical alignment (VA) mode, or a multi-domain vertical alignment (MVA) mode, or may be a transverse electrical field mode such as an in-plane switching (IPS) mode, or a fringe field switching (FFS) mode.

Since the front panel 10 is driven in a field sequential manner, the front panel 10 does not have a color filter. For this reason, there is no reduction in the transmittance of light due to a color filter. In addition, in a color filter liquid crystal display panel, since each pixel includes a plurality of subpixels (for example, three subpixels corresponding to the three primary colors R, G and B), a light blocking region for partitioning the subpixels is provided. On the other hand, since it is not necessary to divide each pixel into a plurality of subpixels (face division) in the front panel 10, partitioning between the subpixels is unnecessary, and the number of source bus lines can be reduced to ⅓. Accordingly, a high aperture ratio can be achieved. However, when the rewriting frequency of the color image of the front panel 10 is to be the same as a typical color filter liquid crystal display panel, it is necessary to set a driving frequency of the pixels of the front panel 10 to, for example, three times that of the color filter liquid crystal display panel. Accordingly, a liquid crystal having excellent response characteristics (fast response liquid crystal) is suitably used in the front panel 10.

The rear panel 20 also includes a TFT substrate 24, a counter substrate 26, and a liquid crystal layer L2 held between the TFT substrate 24 and the counter substrate 26. The counter substrate 26 includes a color filter CF. The rear panel 20 also includes a front face side polarizer 22F and a back face side polarizer 22B with the liquid crystal layer L2 interposed therebetween. The back face side polarizer 22B and the front face side polarizer 22F may be disposed in the cross-Nicol alignment. In this example, the front face side polarizer 22F is disposed on the counter substrate 26 on the viewer side, and the back face side polarizer 22B is disposed on the TFT substrate 24 on the back face side.

The front face side polarizer 22F is preferably arranged such that a transmission axis thereof is parallel to a transmission axis of the back face side polarizer 12B of the front panel 10, that is, these transmission axes are in a parallel Nicol relationship. Accordingly, a brighter display can be realized. Note that it is sufficient that the front face side polarizer 22F and the back face side polarizer 12B be arranged so that the transmission axes thereof are not orthogonal to each other, and these axes may be at an angle of greater than 0° and 45° or less when viewed from the panel surface normal direction. The operation mode of the rear panel 20 is not particularly limited, and may be a known vertical electric field mode or transverse electric field mode as described above.

As described above, in the first mode, the rear panel 20 displays different colors in a time division manner in one frame period. For this reason, a fast response liquid crystal having the same degree of responsiveness as the front panel 10 (that is, higher than a known color filter liquid crystal display panel) is suitably used for the rear panel 20. A response time of the fast response liquid crystal is ⅓ or less of at least one frame period, preferably ⅙ or less of one frame period, and more preferably a writing period or less in each field described below.

Each of the second pixels PX2 in the rear panel 20 is divided into a plurality of subpixels including at least a first subpixel p1, a second subpixel p2, and a third subpixel p3. The color filter CF formed on the counter substrate 26 includes a first color layer c1 disposed in the first subpixel p1 of each second pixel PX2 and that allows transmission of light of a first color, a second color layer c2 disposed in the second subpixel p2 of each second pixel PX2 and that allows transmission of light of a second color, and a third color layer c3 disposed in the third subpixel p3 of each second pixel PX2 and that allows transmission of light of a third color.

One of the first color, the second color and the third color may be red (R), one of the other may be green (G), and the remaining one may be blue (B). Here, an example in which the first color is red (R), the second color is green (G), and the third color is blue (B) will be described. In this case, the color filter CF has a red layer that transmits red light, a green layer that transmits green light, and a blue layer that transmits blue light. Each second pixel PX2 includes an R subpixel having a red layer, a G subpixel having a green layer, and a B subpixel having a blue layer.

Note that each of the pixels may be divided into four or more subpixels corresponding to different colors from each other. In this case, the color filter CF may include four or more layers that transmit different colors from each other.

Each of the subpixels p1, p2 and p3 exhibits a black display state indicating brightness corresponding to the lowest gray scale, and a white display state indicating brightness corresponding to the highest gray scale. In addition, each subpixel p1, p2 and p3 may be configured such that an "intermediate gray scale display state" indicating brightness corresponding to an intermediate gray scale can be exhibited.

The backlight 30 is, for example, an edge light type backlight. The backlight 30 has a light source unit 32 and a light guide plate 34. The light source unit 32 includes a white light source that can emit white light. The light guide plate 34 guides white light emitted from the light source unit 32 to the rear panel 20.

Operations of Liquid Crystal Display Device 100

Next, operations of the liquid crystal display device 100 will be described in comparison with a liquid crystal display device of a reference example using a multi-color backlight.

Figure 11:
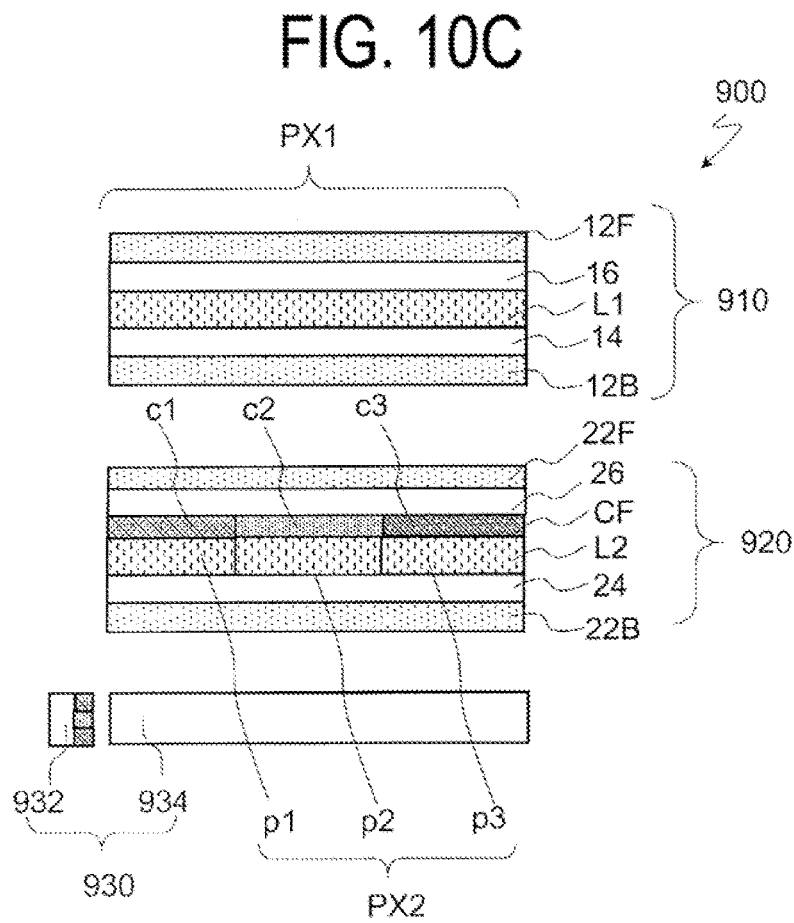
FIG. 11 is a schematic cross-sectional view illustrating a liquid crystal display device 900 of a reference example.

FIG. 11 is a schematic cross-sectional view illustrating a liquid crystal display device 900 according to a reference example. Similar to the liquid crystal display device 100, the liquid crystal display device 900 of the reference example includes a front panel 910 configured to perform color display in a field sequential manner, a rear panel 920 configured to perform color display in a color filter manner, and a backlight 930 disposed on the rear panel 920 on a back face side. The liquid crystal display device 900 of the reference example differs from the liquid crystal display device 100 in that the backlight 930 is a multi-color backlight. The backlight 930 includes a light source unit 932 that can emit light of a plurality of colors including red light, green light, and blue light, and a light guide plate 934. The light source unit 932 includes a red LED, a green LED, and a blue LED, for example. The front panel 910 and the rear panel 920 may each have the same configuration as the front panel 10 and the rear panel 20 in the liquid crystal display device 100. However, the rear panel 920 does not need to use a fast response liquid crystal capable of field sequential driving, and a liquid crystal used in a general color filter liquid crystal display panel is used.

Table 1 shows operations of a first mode in which an image is displayed on the front panel 10 in a field sequential manner and a second mode in which an image is displayed on the rear panel 20 in a color filter manner in the liquid crystal display device 100 and the liquid crystal display device 900 of the reference example. Here, a case in which the first color, the second color, and the third color are red (R), green (G) and blue (B), and each of the second pixels PX2 of the rear panel 20 includes three subpixels (an R subpixel, a G subpixel, and a B subpixel) will be described as an example.

First, a summary of an operation of the liquid crystal display device 100 will be described with reference to FIG. 2.

As shown in Table 1, in the first mode, the backlight 30 switches between an ON state in which white light is emitted to the rear panel 20 multiple times during one frame period and an OFF state in which white light is not emitted, to thereby perform blinking display of white light. Note that switching between the ON state and the OFF state may be performed by turning the light source unit 32 on and off. Alternatively, by providing a shutter (not illustrated), switching between the ON state and the OFF state of the backlight 30 can also be performed.

The rear panel 20 is configured to synchronize with the on/off of the backlight 30, for example, and sequentially performs red display, green display, and blue display over the entire display region. When the red display is performed on the entire display region, for example, only R subpixels of each of the second pixels PX2 are in a white display state, and the other subpixels are in a black display state. Similarly, when green display (or blue display) is performed, only G subpixels (or B subpixels) are in the white display state. As a result, red light, green light, and blue light can be sequentially incident on the front panel 10 from the rear panel 20.

The front panel 10 displays a color image in a field sequential manner by red light, green light, and blue light incident on the front panel 10 from the rear panel 20 in a time division manner.

On the other hand, in the second mode, it is not necessary to cause the backlight 30 to blink a plurality of times in one frame period. The backlight 30 may be continuously illuminated for one frame period (white light continuous display). Alternatively, the backlight 30 may be turned off for a partial period in one frame period. Note that when the backlight 30 is turned off for a plurality of periods within one frame period, the total brightness of the image displayed on the rear panel 20 can be adjusted by increasing or decreasing the number of times that the backlight 30 is turned off within one frame period.

The rear panel 20 includes R subpixels, G subpixels, and B subpixels, and displays three colors of R, G and B simultaneously to display a color image when the backlight 30 is turned on (ON state).

In the front panel 10, for example, all the first pixels in the display region are set to a transparent display state (here, a white display state). This allows the image displayed in the rear panel 20 to be visually recognized through the front panel 10.

Note that, although an example in which the rear panel 20 sequentially performs red display, green display, and blue display over the entire display region (that is, all of the second pixels in the display region) in the first mode is shown in Table 1, in the present embodiment, red display, green display, and blue display may be sequentially performed in at least some of the second pixels. For example, as will be described later, in one frame period, only some second pixels may sequentially display different colors (e.g., R, G and B), and in some other second pixels, all of the subpixels may be set to a black display state to display the black color.

Furthermore, in Table 1, an example in which images of R, G and B are sequentially displayed for one frame period in the front panel 10 has been shown, but the order of the colors to be displayed is not limited to this example. In addition, the first color, the second color, and the third color may each be other colors. Furthermore, in a case where the rear panel 20 includes four or more subpixels, four or more different color images can be sequentially displayed in one frame period.

Although an example in which the entire display region of the front panel 10 is set to the transparent display state in the second mode is shown in Table 1, the first pixels of at least a part of the front panel 10 need only be set to the transparent display state. This allows at least a part of the image displayed on the rear panel 20 to be visually recognized. For example, a gray scale signal that assumes a black display state may be written to a first pixel in a part of the front panel 10, and another first pixel of the front panel 10 may be in a transparent display state. As a result, the viewer can visually recognize text information or the like displayed on the front panel 10 superimposed with the image displayed on the rear panel 20.

Next, operations of the liquid crystal display device 900 of the reference example will be described with reference to FIG. 11.

As shown in Table 1, in the first mode, all of the subpixels of each of the second pixels in the rear panel 920 are in a liquid crystal alignment state (white display state) in which the transmittance of light is greatest, and the red light, green light, and blue light are sequentially emitted from the backlight 930 (R, G and B blinking display). Some of the red light, green light, and blue light emitted from the backlight 930 passes through the rear panel 920 and is incident on the front panel 910. As a result, the color image is displayed on the front panel 910 in the field sequential manner.

In the second mode, the backlight 930 emits white light by turning on all of R, G and B. Other operations are similar to those of the liquid crystal display device 100.

In this way, while a multi-color backlight capable of emitting the respective colors of light is used in the liquid crystal display device 900 of the reference example, it is not necessary to sequentially turn on each color of light, and thus a white light backlight need only be used in the liquid crystal display device 100. Accordingly, for example, light sources (red LED, green LED, and blue LED) of R, G and B are unnecessary, and the backlight structure can be simplified over the liquid crystal display device 900 of the reference example.

However, in the liquid crystal display device 100, since the rear panel 20 is driven in conjunction with the field sequential driving of the front panel 10, a liquid crystal having a similar high response to that of the front panel 10 is also used in the rear panel 20.

TABLE 1

| Mode | Liquid crystal display device 100 | | Liquid crystal display device 900 of reference example | |
|---|---|---|---|---|
| | First mode | Second mode | First mode | Second mode |
| Panel that displays image | Front panel | Rear panel | Front panel | Rear panel |
| Display of front panel 10 | Image | Full white display | Image | Full white display |
| Display of rear panel | Overall R to G to B | Image | Full white display | Image |

TABLE 1-continued

|  | Liquid crystal display device 100 | | Liquid crystal display device 900 of reference example | |
| --- | --- | --- | --- | --- |
| Mode | First mode | Second mode | First mode | Second mode |
| 20 Backlight | display White light blinking display | White light continuous display | R to G to B blinking display | White light continuous display |

Note that the above-described WO 2015/190588 also illustrates a display device using a field sequential liquid crystal display panel as a front display and a color filter liquid crystal display panel as a rear display. However, in this example, the rear display performs display by a white backlight disposed on the back face side, and the front display performs display by a separately arranged multi-color backlight. That is, two types of backlights are used. This document does not disclose a structure that utilizes white backlights to perform color display of the front display as well as the rear display.

Next, timing of switching the backlight on/off and timing of writing image signals to each panel in the first mode of the liquid crystal display device 100 will be described in more detail with reference to the drawings.

In the first mode, the front panel 10 is driven in a field sequential manner. In the field sequential manner, one frame period is divided into a plurality of fields and a different color is displayed for each field. Each field includes a period (writing period) for writing image data of a color to be displayed to each of the first pixels, and a period (display period) for displaying an image of the color after the writing period. Here, an example in which one frame period is divided into three fields, namely, a first field in which a first color is displayed, a second field in which a second color is displayed, and a third field in which a third color is displayed is illustrated. The first field includes a first writing period and a first color display period in which a first color is displayed. The second field includes a second writing period and a second color display period in which a second color is displayed. The third field includes a third writing period and a third color display period in which a third color is displayed. Hereinafter, a case in which the first color, the second color, and the third color are red (R), green (G), and blue (B), respectively, will be described as an example.

Figure 3:
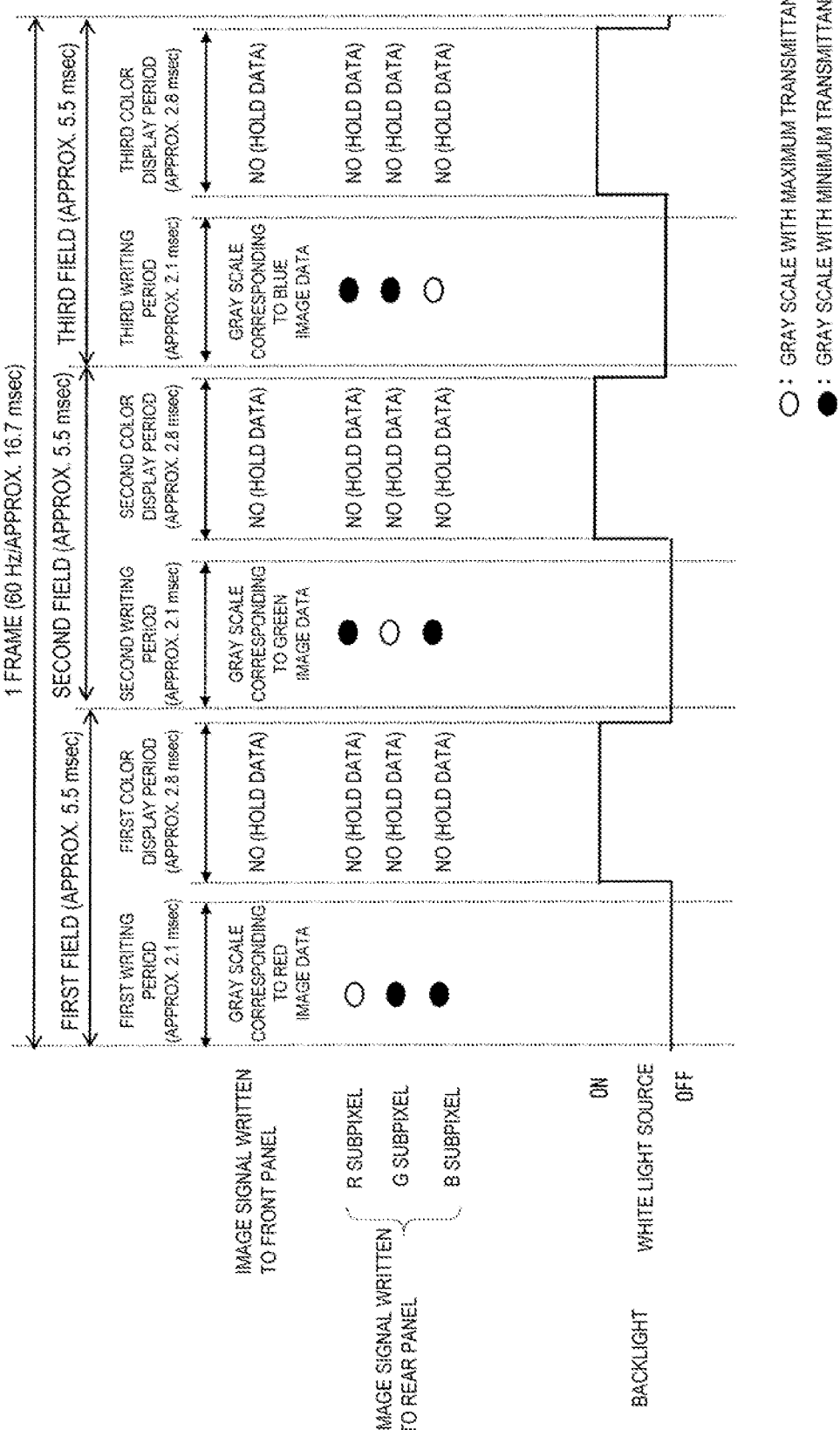
FIG. 3 is a diagram illustrating an operation of a first mode of the liquid crystal display device 100.
Figure 4A:
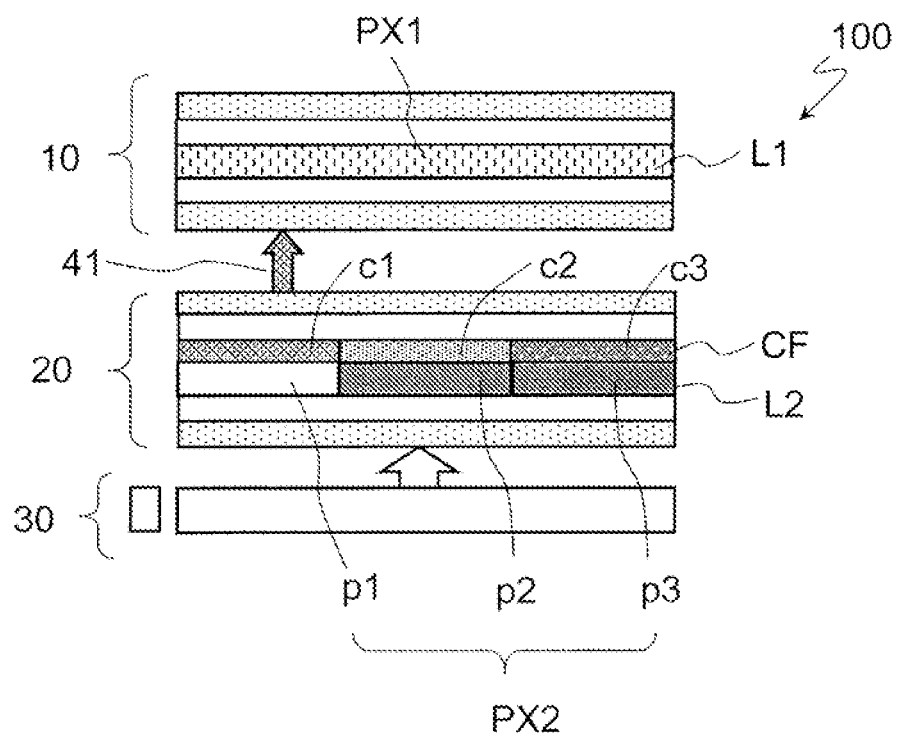
FIG. 4A is a schematic cross-sectional view illustrating a first color display period of a first field illustrated in FIG. 3.
Figure 4B:
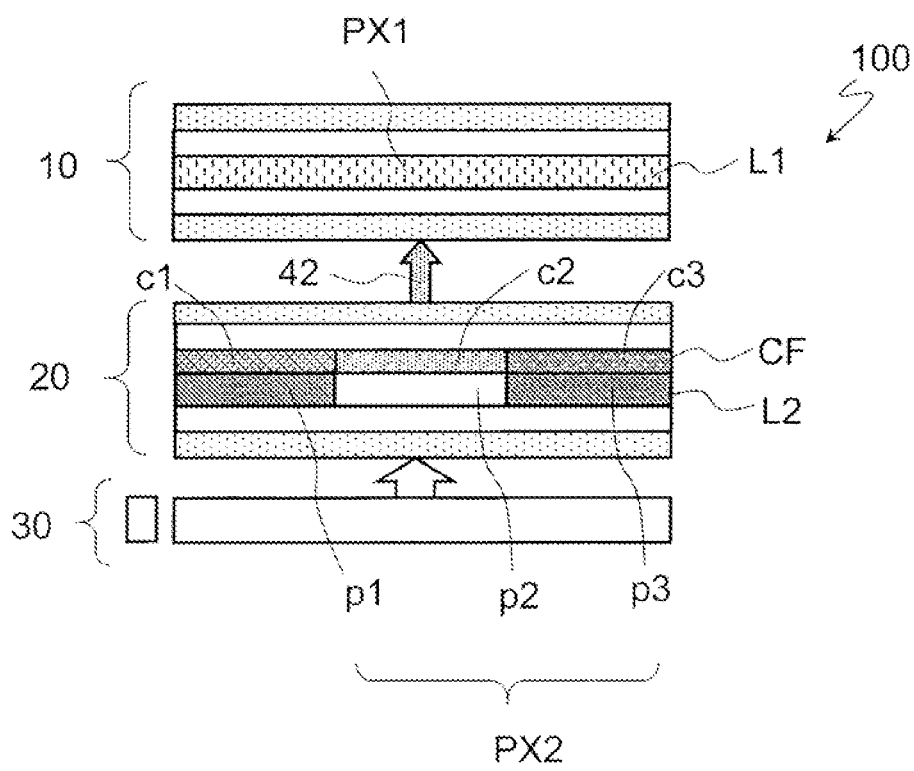
FIG. 4B is a schematic cross-sectional view illustrating a second color display period of a second field illustrated in FIG. 3.
Figure 4C:
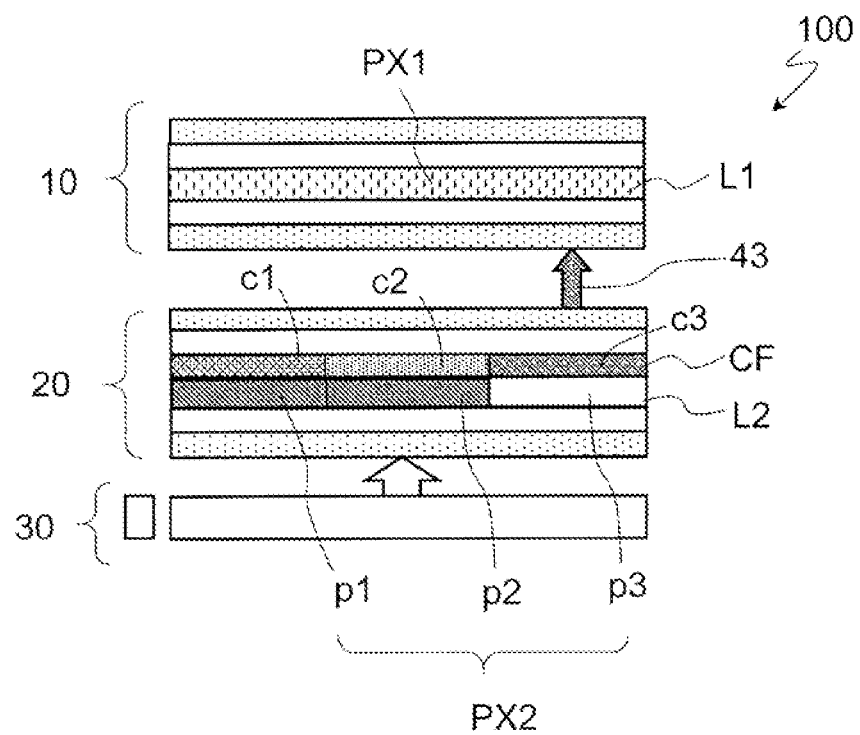
FIG. 4C is a schematic cross-sectional view illustrating a third color display period of a third field illustrated in FIG. 3.

FIG. 3 is a diagram illustrating operations of the front panel 10, the rear panel 20, and the backlight 30 in the first mode of the liquid crystal display device 100. FIGS. 4A to 4C are schematic cross-sectional views for explaining display periods of the first field, the second field, and the third field of the liquid crystal display device 100.

As illustrated in FIG. 3, the backlight 30 is controlled to be in an ON state in the display period of each field and in an OFF state in the writing period of each field. Note that after the writing period, the backlight 30 preferably turns on after the liquid crystal responds to a written image signal. When the backlight 30 is turned on during the response of the liquid crystal, a gray scale different from a desired gray scale may appear as a residual image, and it may not be possible to display an image with high display quality.

In the first writing period of the first field, a gray scale signal corresponding to a liquid crystal alignment state (white display state) in which the transmittance of light is greatest is written to the first subpixel (here, the R subpixel) in each second pixel of the rear panel 20 in a state in which the backlight 30 is turned off (OFF state), and a gray scale signal corresponding to a liquid crystal alignment state (black display state) in which the transmittance of light is at the minimum is written to the other subpixels (here, the G subpixel and the B subpixel). In addition, a gray scale signal corresponding to the image data of the first color (red color) is written to each first pixel of the front panel 10.

In the first color display period, the backlight 30 is switched to the ON state with the liquid crystal alignment state set in the first writing period maintained in each of the front panel 10 and the rear panel 20. As a result, as illustrated in FIG. 4A, a red light 41 is emitted from the first subpixel (R subpixel) p1 in each of the second pixels PX2 of the rear panel 20, and the red color is displayed across the entire display region (full color red display). The red light 41 transmitted through the rear panel 20 causes the front panel 10 to display a red image.

Here, in each writing period, the number of writing times of the gray scale data need not be one for each of the first pixels of the front panel 10 and each of the subpixels of the rear panel 20. For example, the gray scale data is written to each first pixel and each subpixel in each writing period twice, and the response of the liquid crystal may be increased by setting the first gray scale data to be gray scale data different from a desired gray scale and the second gray scale data to be the desired gray scale.

Similarly in the second field, in the second writing period, the backlight 30 is in the OFF state, a gray scale signal corresponding to the white display state is written to the second subpixel (G subpixel) in each second pixel of the rear panel 20, and a gray scale signal corresponding to the black display state is written to the other subpixels (R subpixel and B subpixel). In addition, a gray scale signal corresponding to the image data of the second color (green color) is written to each first pixel of the front panel 10.

In the second color display period, the backlight 30 is switched to the ON state with the liquid crystal alignment state set in the second writing period maintained in each of the front panel 10 and the rear panel 20. As a result, as illustrated in FIG. 4B, a green light 42 is emitted from the second subpixel (G subpixel) p2 in each of the second pixels PX2, and the green color is displayed across the entire display region (full green display). The green light 42 transmitted through the rear panel 20 causes the front panel 10 to display a green image.

Similarly, as illustrated in FIG. 3 and FIG. 4C, in the third field, the blue color is displayed across the entire rear panel 20, and a blue image is displayed on the front panel 10 by a blue light 43 transmitted through the rear panel 20.

Note that, in the first mode, color display may be performed on only a part of the display region of the front panel 10, and some other part may be in a transparent display state. That is, the display region of the front panel 10 may include an image display region that displays an image and a transparent display region that transmits the background. In this case, the color image may be displayed at a position corresponding to the transparent display region of the front panel 10 in the display region of the rear panel 20 using white light that is blinking and displayed from the backlight 30. In this case, the front panel 10 and the rear panel 20 are preferably disposed in close proximity, and more preferably the front panel 10 is connected to the rear panel 20. As a result, even in a case in which, for example, the viewer observes the front panel 10 at an angle, more appropriate display is obtained since the shift between the position of the transparent display region of the front panel 10 and the position of the image of the rear panel 20 can be reduced.

On the other hand, in the second mode, switching on and off of the backlight 30 need not be performed for each field in one frame period. The backlight 30 may be in an ON state for one frame period (white light continuous display). Alternatively, one frame period may be divided into a writing period and a display period, and the backlight 30 may be turned off in the writing period. Note that in the second mode, the backlight 30 may be driven as described above to perform display of the rear panel 20, and the display of the rear panel 20 is not limited to the color display and may be a full white display or a full black display.

Figure 5A:
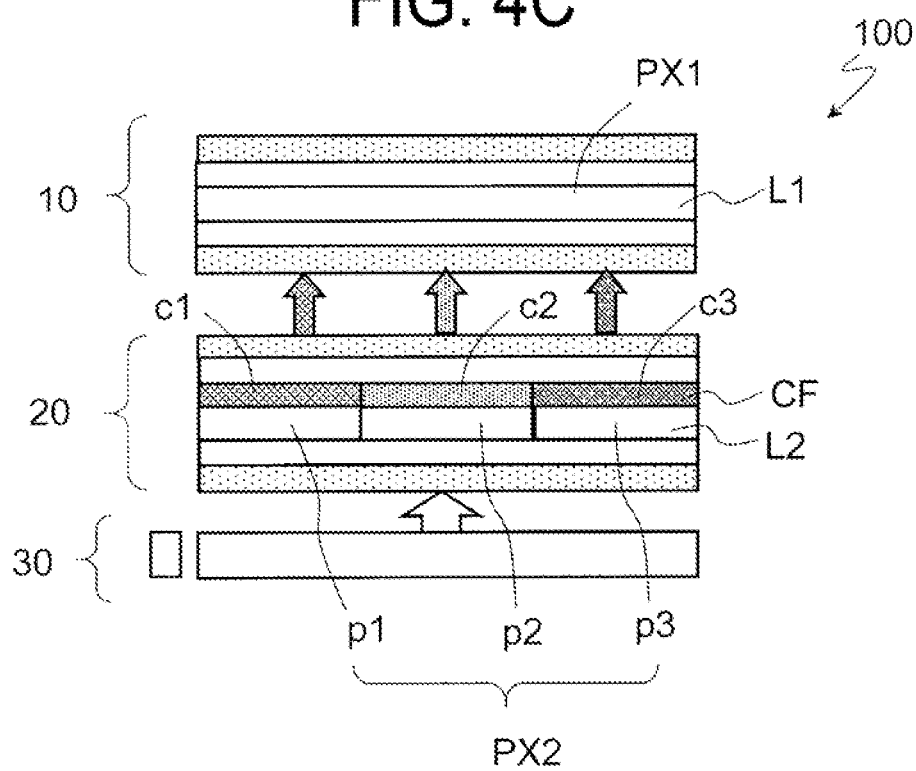
FIG. 5A is a schematic cross-sectional view illustrating a second mode of the liquid crystal display device 100.
Figure 5B:
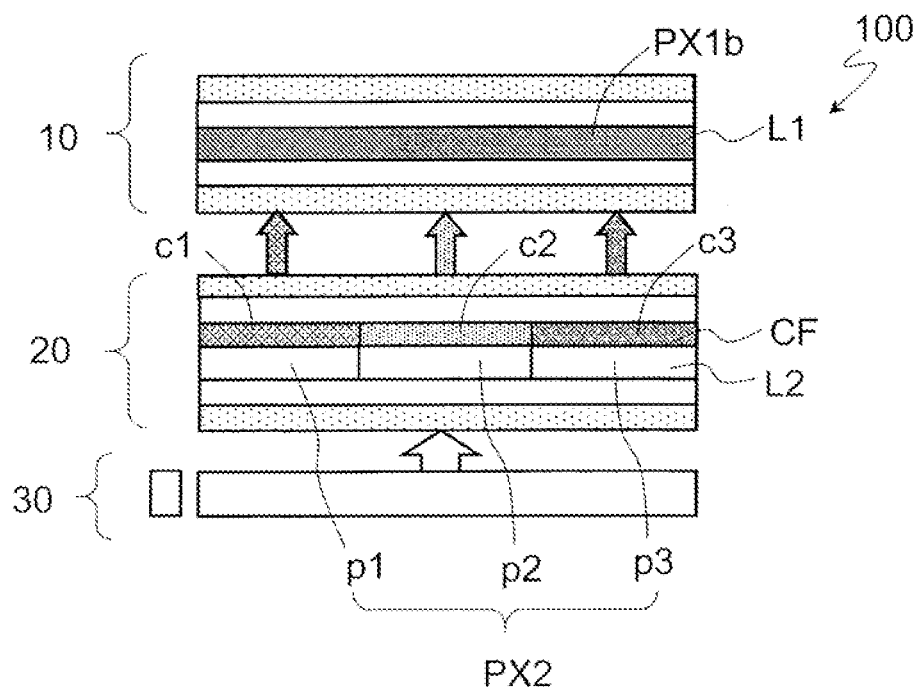
FIG. 5B is a schematic cross-sectional view illustrating the second mode of the liquid crystal display device 100.

FIGS. 5A and 5B are schematic cross-sectional views for illustrating a state in which an image is displayed on the rear panel 20 in the second mode of the liquid crystal display device 100.

As illustrated in FIG. 5A, the image is displayed on the rear panel 20 by writing a gray scale signal corresponding to image data to each of the subpixels p1, p2 and p3 of the rear panel 20 and turning the backlight 30 to the ON state. At this time, all of the first pixels PX1 of the front panel 10 may be set to a transparent display state (for example, a white display state) (full white display). This allows the viewer to visually recognize the image displayed on the rear panel 20 through the front panel 10.

In the second mode, as illustrated in FIG. 5B, some of first pixels PX1*b* in the front panel 10 may be set to a black display state, and the other first pixels may be set to a transparent display state (white display state). As a result, character information and the like can be displayed in black on a part of the display region of the front panel 10. Another part of the display region is a transparent display region that transmits the background. Accordingly, the viewer can visually recognize the image displayed on the rear panel 20 superimposed with a portion (for example, character information) shown in black in the front panel 10.

Figure 6:
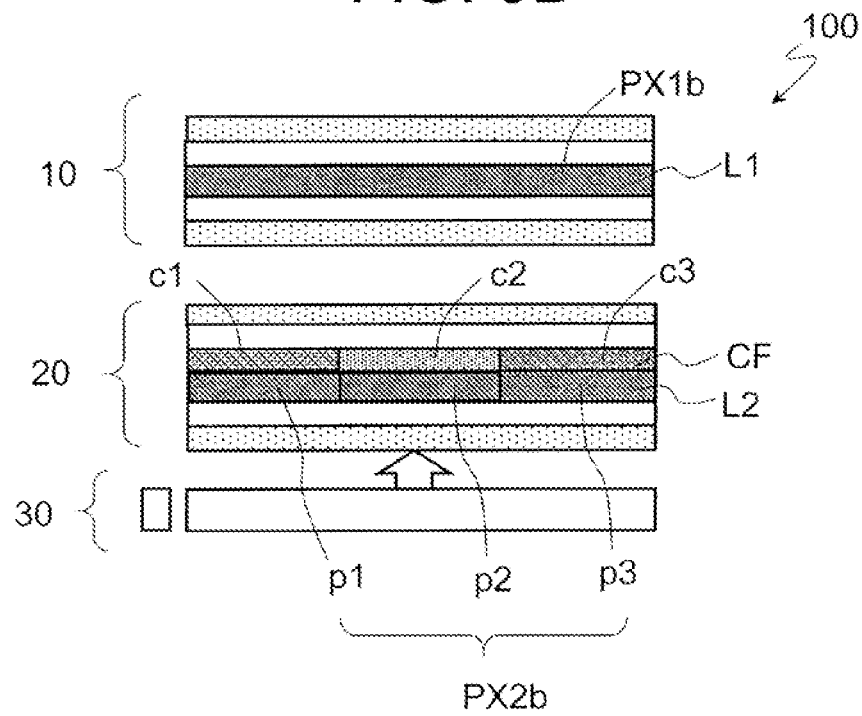
FIG. 6 is a schematic cross-sectional view illustrating the second mode of the liquid crystal display device 100.

By setting the first pixel PX1*b* in the part of the front panel 10 to the black display state and the other first pixels to the transparent display state (white display state), the color image may not be displayed on the rear panel 20 when character information or the like is displayed on the front panel 10. For example, all the second pixels in the display region may be in a white display state. Alternatively, as illustrated in FIG. 6, among the plurality of second pixels in the rear panel 20, second pixels located at positions corresponding to the first pixels PX1*b* in the black display state of the front panel 10 (that is, R, G and B subpixels in the pixel) PX2*b* may be in a black display state, and the other second pixels may be in a white display state. This makes it possible to more reliably block the incidence of light emitted from the backlight 30 to the first pixel PX1*b* in the front panel 10. As a result, since the black brightness of the black display of the front panel 10 can be reduced, the display contrast can be improved.

Figure 12:
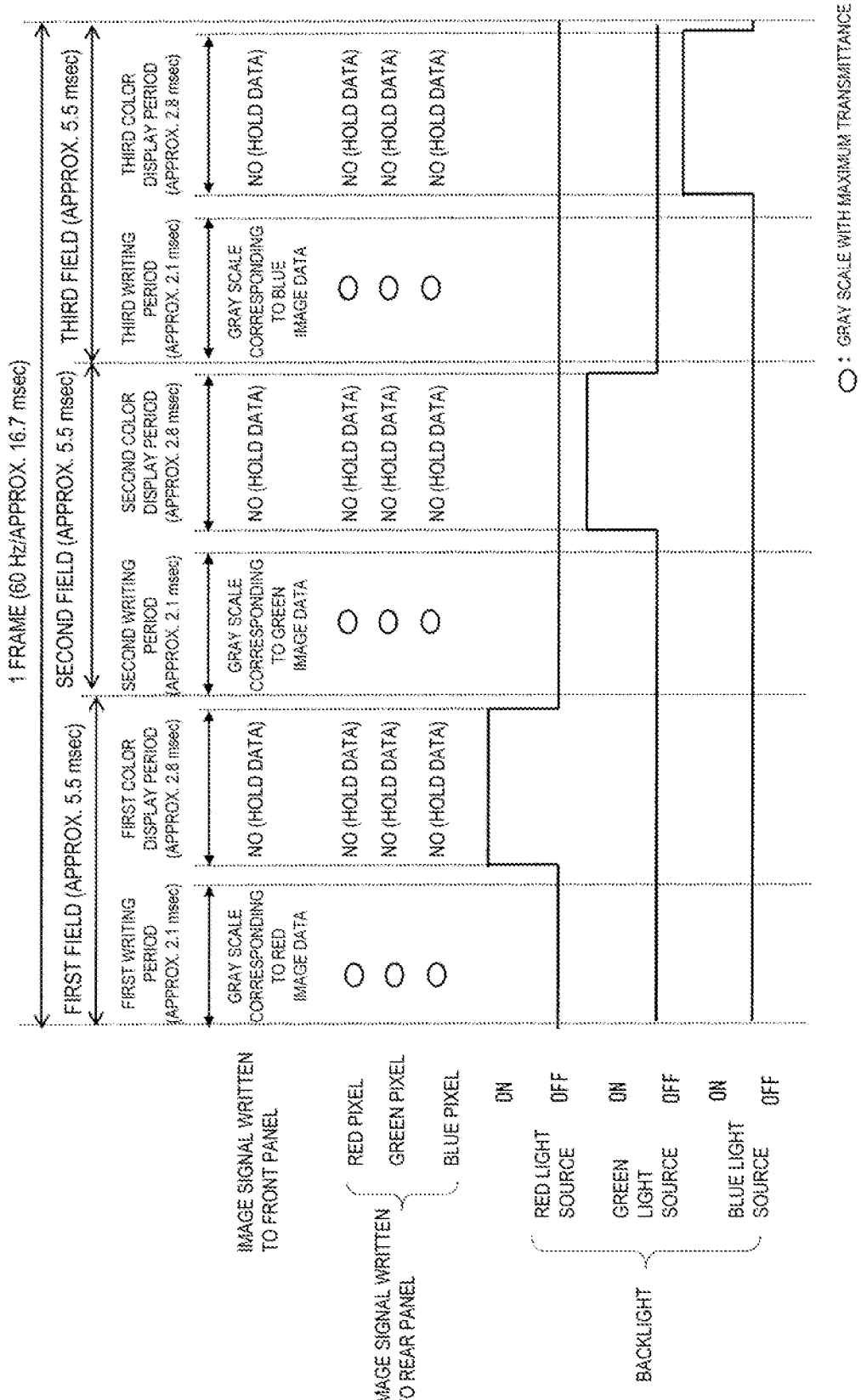
FIG. 12 is a view illustrating an operation of a first mode of the liquid crystal display device 900 of the reference example.
Figure 13A:
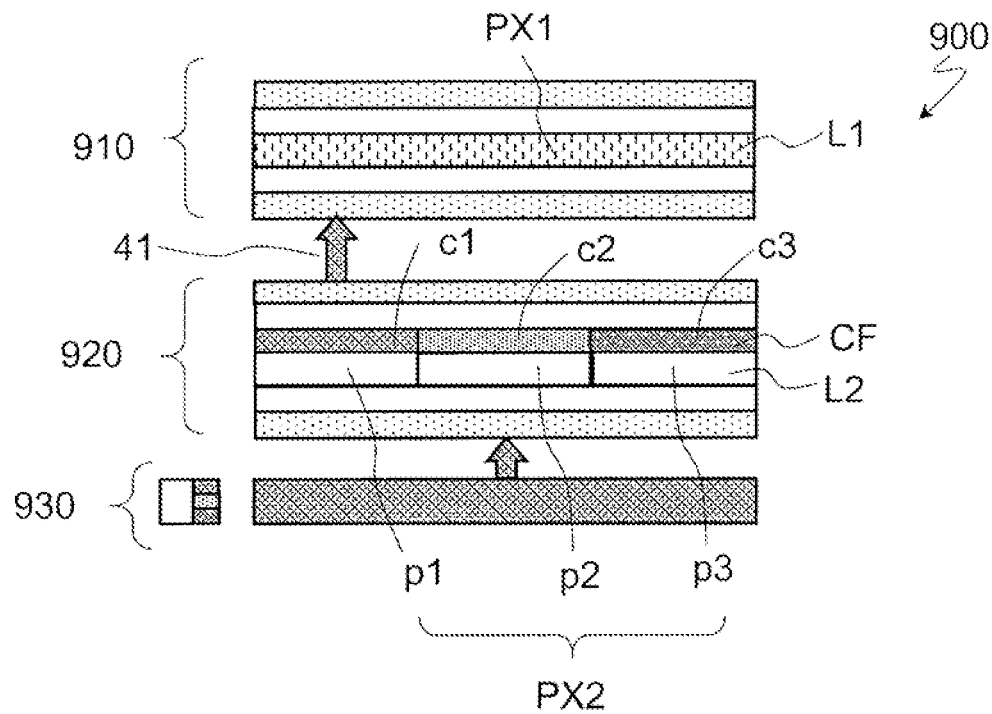
FIG. 13A is a schematic cross-sectional view illustrating the first color display period of the first field illustrated in FIG. 12.
Figure 13B:
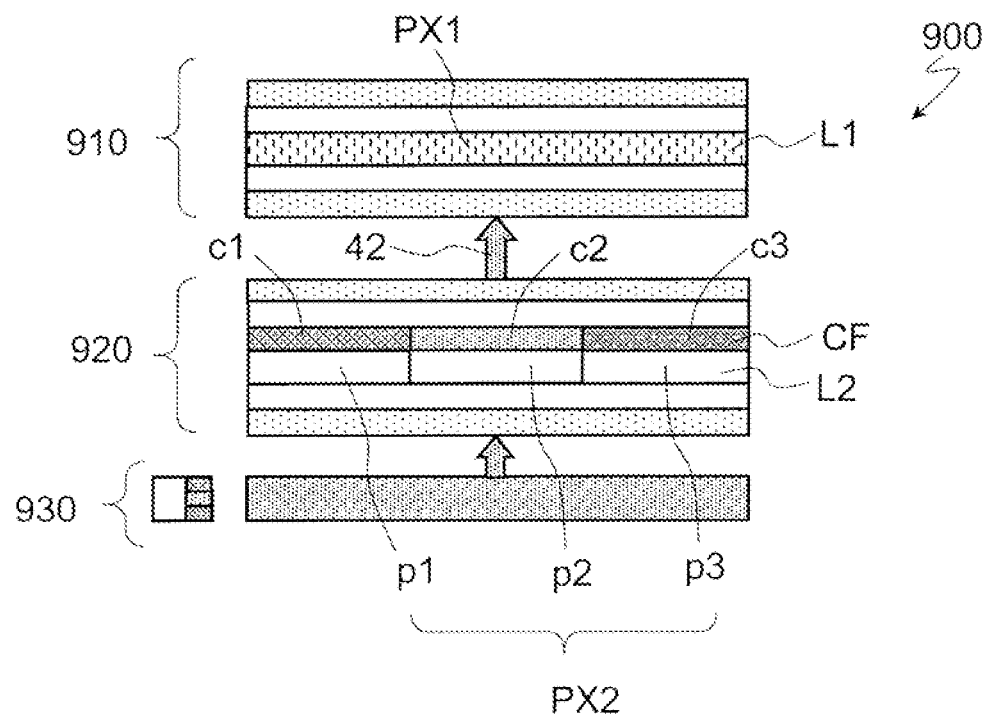
FIG. 13B is a schematic cross-sectional view illustrating the second color display period of the second field illustrated in FIG. 12.
Figure 13C:
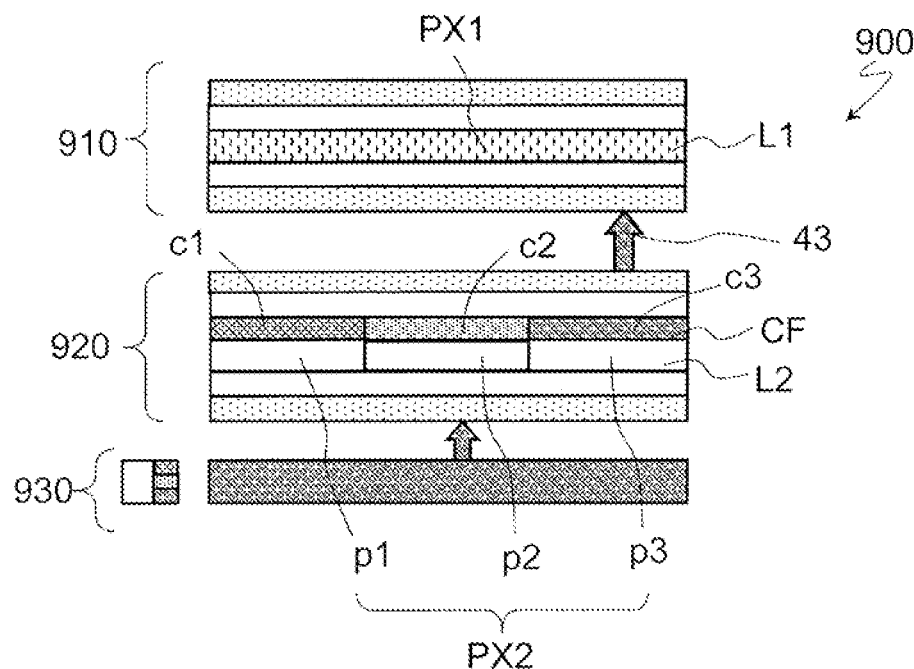
FIG. 13C is a schematic cross-sectional view illustrating the third color display period of the third field illustrated in FIG. 12.

For comparison, the first mode and the second mode of the liquid crystal display device 900 of the reference example will be described. FIG. 12 is a view illustrating operation of the front panel 910, the rear panel 920, and the backlight 930 in the first mode of the liquid crystal display device 900 in the reference example. FIGS. 13A to 13C are schematic cross-sectional views for explaining display periods of the first field, the second field, and the third field of the liquid crystal display device 900 of the reference example.

In the liquid crystal display device 900 of the reference example, a gray scale signal corresponding to the white display state is written to all of the subpixels in each of the second pixels PX2 of the rear panel 920 in a state in which the backlight 930 is turned off (OFF state) in the first writing period of the first field. In addition, a gray scale signal corresponding to red image data is written to each first pixel of the front panel 910.

In the first color display period, red light is emitted from the backlight 930 with the liquid crystal alignment state set in the first writing period maintained in each of the front panel 910 and the rear panel 920 (R ON state). Some of the red light emitted from the backlight 930 passes through the first subpixel (R subpixel) p1 in each second pixel PX2 of the rear panel 920, as illustrated in FIG. 13A. The red light 41 transmitted through the rear panel 920 causes the front panel 910 to display a red image.

Note that although subpixels other than R subpixels (G subpixels and B subpixels) are also set to the white display state, the red light emitted from the backlight 930 is absorbed by the color filters of these subpixels, and the red light transmits through little of these subpixels.

Similarly, as illustrated in FIG. 12 and FIG. 13B, in the second field, a green image is displayed on the front panel 910 by the green light 42 transmitted through the second subpixels p2 of the rear panel 920. Thereafter, as illustrated in FIG. 12 and FIG. 13C, in the third field, a blue image is displayed on the front panel 910 by the blue light 43 transmitted through the third subpixels p3 of the rear panel 920.

Figure 14A:
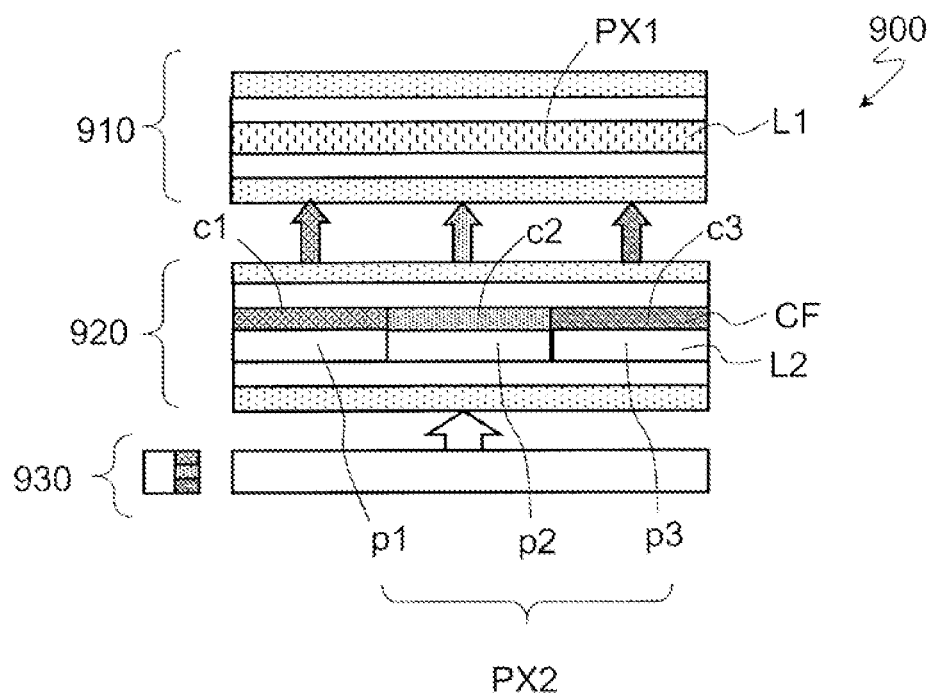
FIG. 14A is a schematic cross-sectional view illustrating a second mode of the liquid crystal display device 900 of the reference example.
Figure 14B:
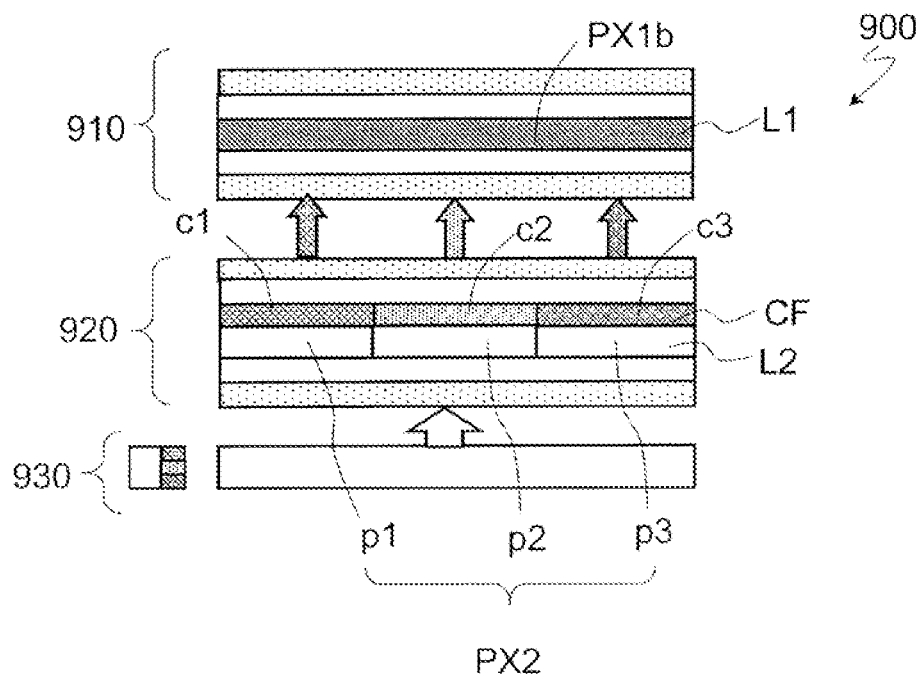
FIG. 14B is a schematic cross-sectional view illustrating the second mode of the liquid crystal display device 900 of the reference example.
Figure 15:
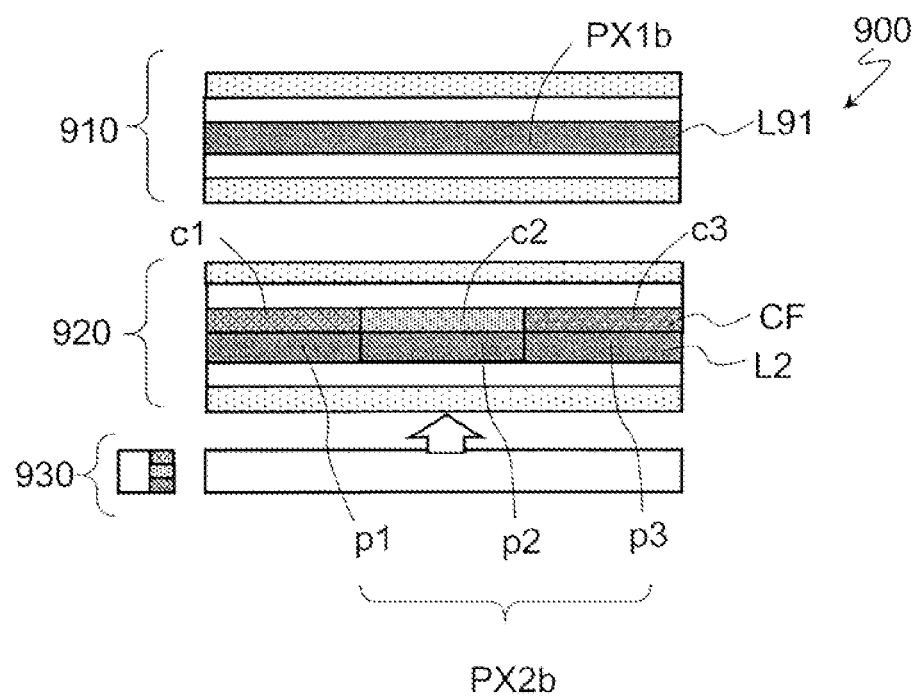
FIG. 15 is a schematic cross-sectional view illustrating the second mode of the liquid crystal display device 900 of the reference example.

FIGS. 14A and 14B are schematic cross-sectional views for illustrating a state in which an image is displayed on the rear panel 920 in the second mode of the liquid crystal display device 900. FIG. 15 is a schematic cross-sectional view for illustrating a state in which black display is performed on the front panel 910 in the second mode of the liquid crystal display device 900.

In the second mode of the liquid crystal display device 900 of the reference example, all of the light sources of R, G and B of the backlight 930 are in an ON state, and white light is emitted from the backlight 930. Other operations may be similar to the operation of the liquid crystal display device 100 described with reference to FIGS. 5A, 5B and 6.

In the liquid crystal display device 900 of the reference example, in the first mode, all of the subpixels of the rear panel 920 are set to the white display state, but the color light emitted from the backlight 930 transmits through only the subpixels corresponding to the color light. For this reason, the transmission efficiency of light of the rear panel 920 is substantially the same as the transmission efficiency of the rear panel 20 of the liquid crystal display device 100. In addition, by using a fast response liquid crystal having a response equivalent to that of the front panel 10 in the rear panel 20 of the liquid crystal display device 100, it is possible to achieve the same display quality as the liquid crystal display device 900 of the reference example. Therefore, according to the present embodiment, the transmission efficiency and display quality of the light of the backlight can be achieved to the same degree as those of the reference example, and costs can be reduced compared to the reference example due to the simplification of the backlight.

First Modification Example

Figure 7:
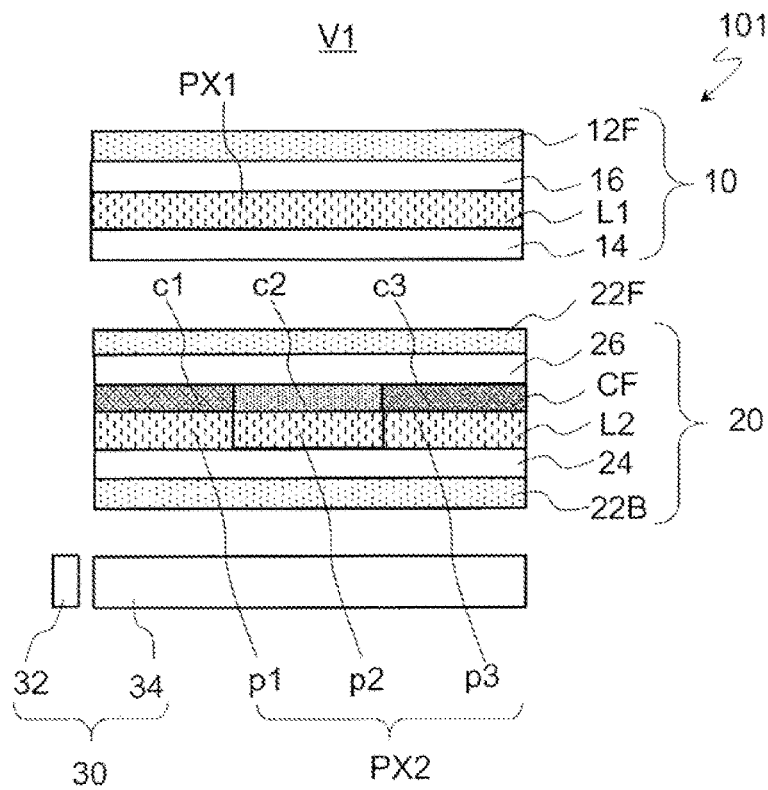
FIG. 7 is a schematic cross-sectional view illustrating another liquid crystal display device 101 according to the first embodiment.

FIG. 7 is a schematic cross-sectional view illustrating another liquid crystal display device 101 according to the present embodiment.

The liquid crystal display device 101 differs from the liquid crystal display device 100 in that no other polarization element (the back face side polarizer 12B in the liquid crystal display device 100) is provided between the liquid crystal layer L1 of the front panel 10 and the front face side polarizer 22F of the rear panel 20.

In a case where the rear panel 20 uses linear polarized light as a display method and a retarder difference plate such as a ¼λ plate is not disposed on the rear panel 20 on the viewer side, light traveling from the front face side polarizer 22F of the rear panel 20 toward the front panel 10 is polarized. For this reason, when an object or the like that disturbs the polarization state of light is not located between the front panel 10 and the rear panel 20, a separate polarization element may not be provided on the front panel 10 on the back face side. By omitting the polarization element of the front panel 10 on the back face side, optical transmittance can be further improved. In addition, since the material cost of one polarization element can be reduced and the step of bonding the polarizing element can be eliminated, it is possible to reduce manufacturing costs.

Second Modification Example

Figure 8:
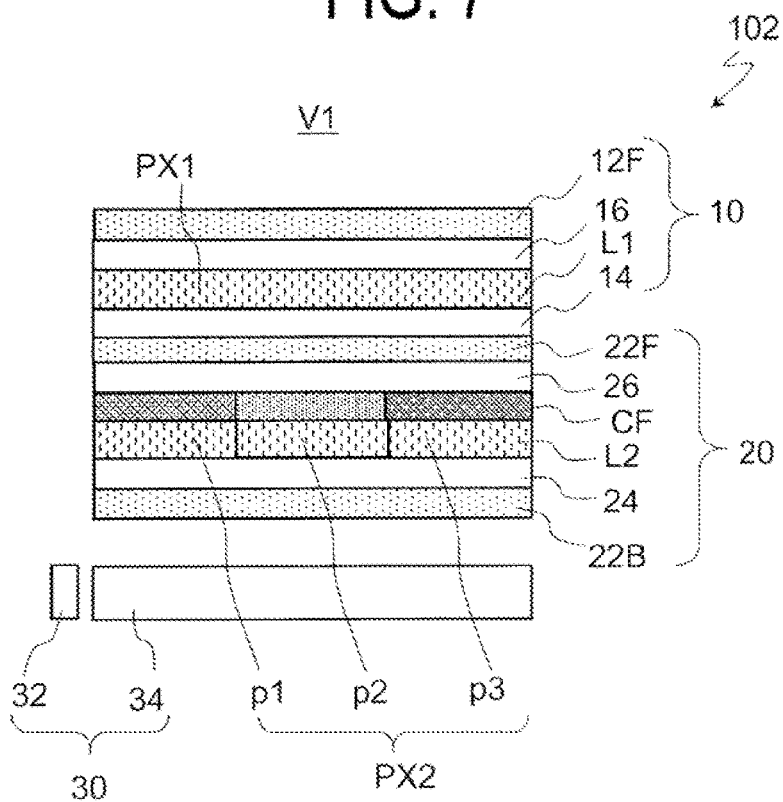
FIG. 8 is a schematic cross-sectional view illustrating another liquid crystal display device 102 according to the first embodiment.

FIG. 8 is a schematic cross-sectional view illustrating yet another liquid crystal display device 102 according to the present embodiment.

The liquid crystal display device 102 differs from the liquid crystal display device 101 in that the front panel 10 and the rear panel 20 are disposed in close proximity. Although not illustrated, the front panel 10 may have a polarizer (the back face side polarizer 12B illustrated in FIG. 2) on the liquid crystal layer L1 on the back face side.

The display regions of the front panel 10 and the rear panel 20 at least partially overlap when viewed from the panel surface normal direction. Circumferential edges of these display regions may substantially match when viewed from the panel surface normal direction.

Figure 9A:
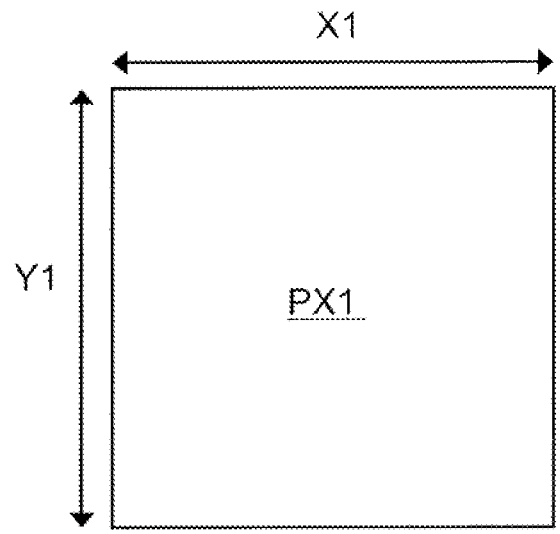
FIG. 9A is a plan view illustrating an array pitch of a first pixel PX1.
Figure 9B:
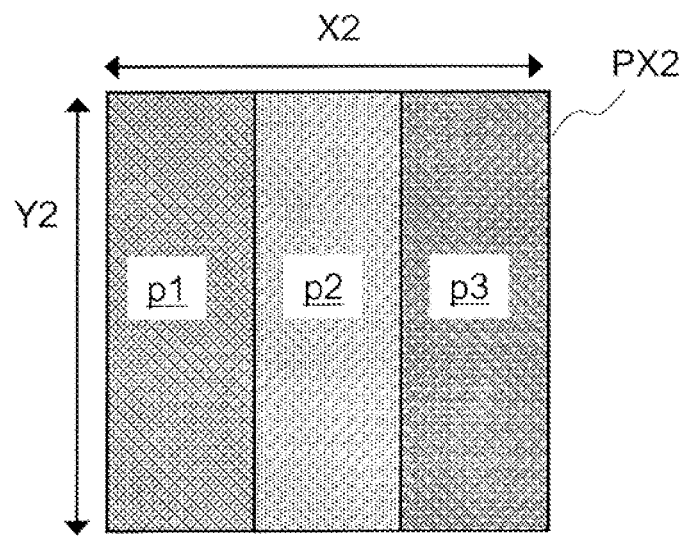
FIG. 9B is a plan view illustrating an array pitch of a second pixel PX2.

FIG. 9A is a plan view illustrating pitches X1 and Y1 in a row direction and a column direction of the first pixel PX1 of the front panel 10, and FIG. 9B is a plan view illustrating pitches X2 and Y2 in a row direction and a column direction of the second pixel PX2 constituted by a plurality of subpixels (here, the three subpixels p1, p2 and p3) in the rear panel 20.

In the present modification example, the pitch X1 in the row direction of the front panel 10 and the pitch X2 in the row direction of the rear panel 20 may be set to be the same, and the pitch Y1 in the column direction of the front panel 10 and the pitch Y2 in the column direction of the rear panel 20 may be set to be the same. In this case, "the front panel 10 and the rear panel 20 are disposed in close proximity" means that light from one second pixel PX2 of the rear panel 20 is adjacent to each other to be incident on a corresponding first pixel PX1 in the front panel 10. The front panel 10 and the rear panel 20 may be connected to each other.

Here, in order to realize a more suitable display, it is preferable to reduce the distance between the liquid crystal layer L1 of the front panel 10 and the liquid crystal layer L2 of the rear panel 20. For this reason, the TFT substrate 14 of the front panel 10 is thinner than the counter substrate 16 (for example, the thickness of the counter substrate 16 is 0.4 mm, and the thickness of the TFT substrate 14 is 0.05 mm), and additionally/alternatively, the counter substrate 26 of the rear panel 20 may be thinner than the TFT substrate 24 (for example, the thickness of the TFT substrate 24 is 0.4 mm, and the thickness of the counter substrate 26 may be 0.05 mm).

Note that the array pitch of each panel is not limited to the above. For example, one of the pitch X1 of the front panel and the pitch X2 of the rear panel may be an integer multiple of the other. Similarly, one of the pitch Y1 of the front panel and the pitch Y2 of the rear panel may be an integer multiple of the other.

In the present modification example, in the first mode in which the front panel 10 is driven in a field sequential manner, the rear panel 20 can be made to function as a so-called active backlight. Hereinafter, this will be described with reference to the accompanying drawings.

Figure 10A:
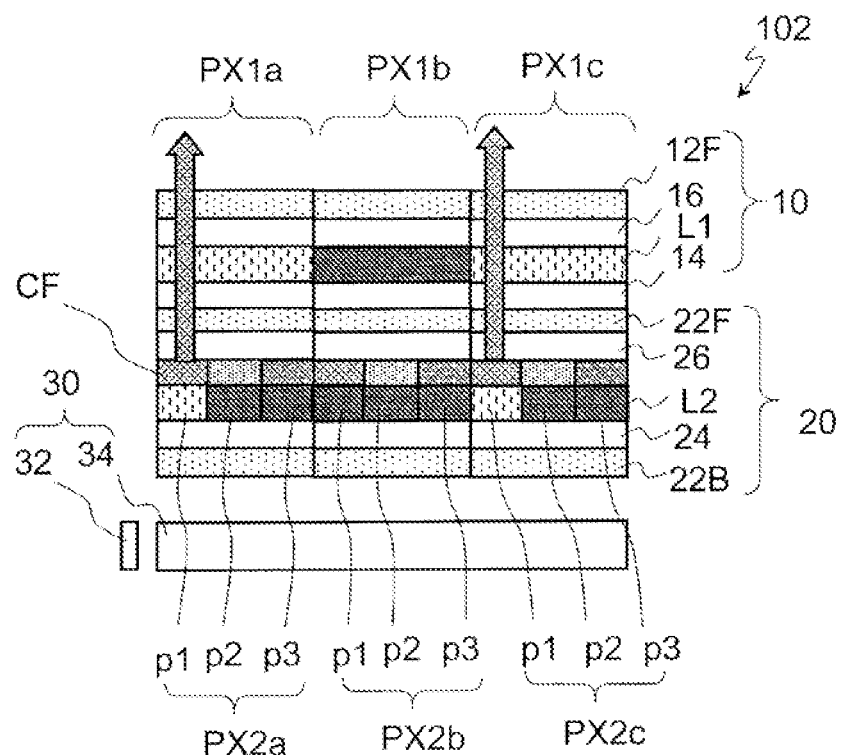
FIG. 10A is a cross-sectional view illustrating another example of the first color display period of the first field.
Figure 10B:
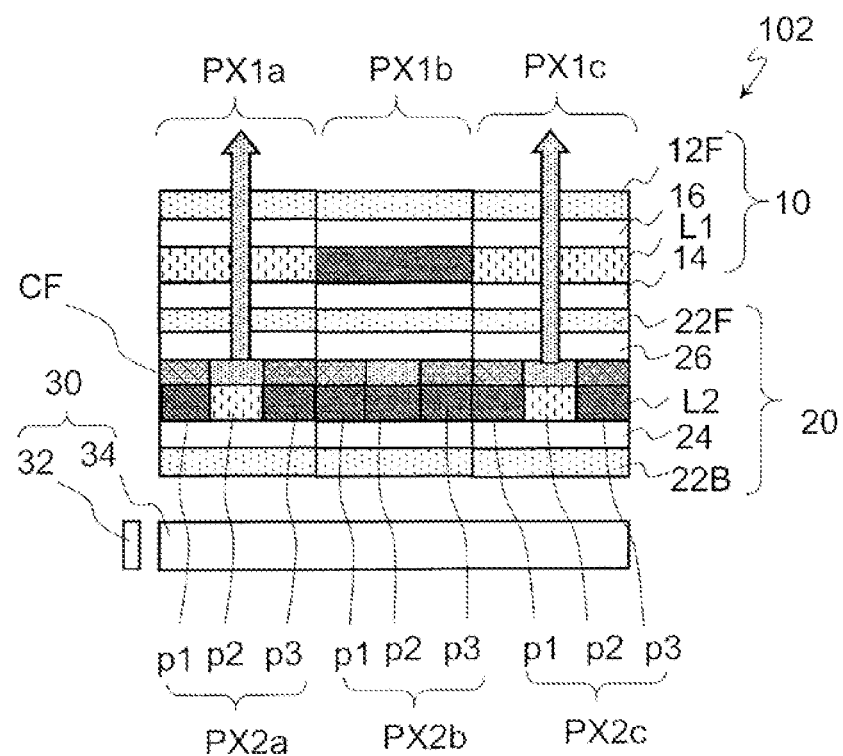
FIG. 10B is a cross-sectional view illustrating another example of the second color display period of the second field.
Figure 10C:
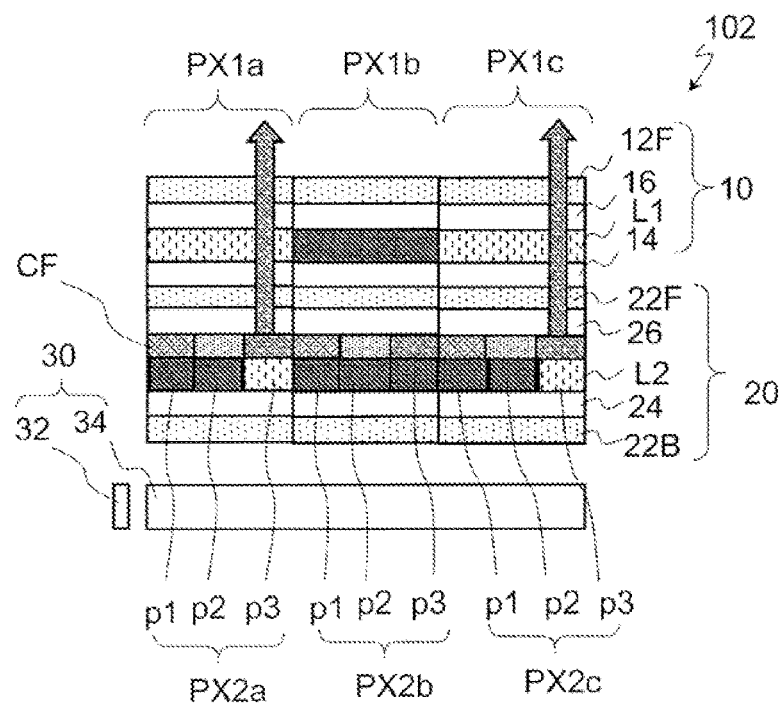
FIG. 10C is a cross-sectional view illustrating another example of the third color display period of the third field.

FIGS. 10A to 10C are schematic cross-sectional views illustrating another example of a display period of the first field, the second field, and the third field of the liquid crystal display device 102.

As illustrated in FIGS. 10A to 10C, in one frame period, when the front panel 10 includes a first pixel PX1b set to a black display state and first pixels Px1a and PX1c set to a different display state, a second pixel PX2b at a position corresponding to the first pixel PX1b in the rear panel 20 may be set to a black display state (that is, a gray scale in which the transmittance is the minimum of all of the subpixels p1, p2, and p3) in all fields of one frame period. The other second pixels in the rear panel 20, herein, the second pixels PX2a, PX2c located at positions corresponding to the first pixels PX1a and PX1c are set to display red in the first field, green in the second field, and blue in the third field (see FIG. 4A to FIG. 4C).

In this way, the rear panel 20 can function to block the light of the backlight 30 toward the first pixel PX1b in the black display state while the color light of R, G and B are sequentially incident on the first pixels PX1a and PX1c in the front panel 10. As a result, since the black brightness of the front panel 10 can be reduced, the display contrast can be improved.

The liquid crystal display device of the present disclosure is not limited to the configuration described above, and various modifications are possible.

In the above-mentioned description, the liquid crystal display device provided with the front panel and the rear panel has been described, but the liquid crystal display device is not limited thereto, and may include three or more liquid crystal display panels arranged so as to overlap each other when viewed from the panel surface normal direction. For example, a plurality of field sequential see-through panels may be disposed on a color filter rear panel on a viewer side.

INDUSTRIAL APPLICABILITY

The liquid crystal display device in the embodiments of the present disclosure may be widely applied to, for example, an information display, a digital signage, an amusement device, a display window, a showcase, or the like.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A liquid crystal display device comprising:
a first liquid crystal display panel of a field sequential type;

a second liquid crystal display panel of a color filter type disposed on a back face side of the first liquid crystal display panel; and a backlight configured to emit white light to a back face side of the second liquid crystal display panel;

wherein the first liquid crystal display panel includes a first display region in which a plurality of first pixels are arranged, each first pixel being configured to be capable of assuming a transparent display state in which at least some of light emitted from the second liquid crystal display panel is transmitted;

the second liquid crystal display panel includes:

a second display region in which a plurality of second pixels each including at least a first subpixel, a second subpixel, and a third subpixel are arranged; and a color filter including a first color layer disposed in the first subpixel of each second pixel and configured to transmit light of a first color, a second color layer disposed in the second subpixel and configured to transmit light of a second color, and a third color layer disposed in the third subpixel and configured to transmit light of a third color, the first liquid crystal display device is switchable between a first mode in which the first liquid crystal display panel performs display in a field sequential manner, and a second mode in which the second liquid crystal display panel performs display in a color filter manner, in the first mode, the first liquid crystal display panel is configured to divide one frame period into a plurality of fields to display different colors for each field, the plurality of fields including at least a first field including a first writing period and a first color display period for displaying a first color image, a second field including a second writing period and a second color display period for displaying a second color image, and a third field including a third writing period and a third color display period for displaying a third color image, the backlight is switched between an ON state in which white light is emitted in the first color display period, the second color display period, and the third color display period, and an OFF state in which white light is not emitted in the first writing period, the second writing period, and the third writing period, and in the second pixels of at least some of the plurality of second pixels of the second liquid crystal display panel, writing is performed to the first subpixel, the second subpixel, and the third subpixel for each field such that a first color is displayed in the first color display period, a second color is displayed in the second color display period, and a third color is displayed in the third color display period, and thus, light of a first color, light of a second color, and light of a third color are incident sequentially on the first liquid crystal display panel from the second liquid crystal display panel in one frame period.

2. The liquid crystal display device according to claim 1, wherein, in the first mode, in each of the at least some of the plurality of second pixels of the second liquid crystal display panel, the first subpixel, the second subpixel and the third subpixel are written such that, in the first color display period, the first subpixel is in a white display state and the second subpixel and the third subpixel are in a black display state, in the second color display period, the second subpixel is in a white display state and the first subpixel and the third subpixel are in a black display state, and in the third color display period, the third subpixel is in a white display state and the first subpixel and the second subpixel are in a black display state.

3. The liquid crystal display device according to claim 1, wherein in the first mode, a first color is displayed in the first color display period, a second color is displayed in the second color display period, and a third color is displayed in the third color display period on the entirety of the second display region of the second liquid crystal display panel.

4. The liquid crystal display device according to claim 1, wherein, in the second mode, the first pixels in at least some of the plurality of first pixels in the first liquid crystal display panel are set to a transparent display state.

5. The liquid crystal display device according to claim 1, wherein the first liquid crystal display panel does not include a color filter.

6. The liquid crystal display device according to claim 1, wherein the first display region of the first liquid crystal display panel and the second display region of the second liquid crystal display panel at least partially overlap when viewed from a normal direction of the first liquid crystal display panel, and the backlight is disposed on a back face side of the second liquid crystal display panel.

7. The liquid crystal display device according to claim 1, wherein the first liquid crystal display panel includes a first liquid crystal layer, and a first polarization element disposed on the first liquid crystal layer on a viewer side, the second liquid crystal display panel includes a second liquid crystal layer, and a second polarization element and a third polarization element disposed on the second liquid crystal layer on a viewer side and a back face side, respectively, and no other polarization element is provided between the first liquid crystal layer and the second polarization element.

8. The liquid crystal display device according to claim 1, wherein an array pitch of the plurality of first pixels in the first liquid crystal display panel and an array pitch of the plurality of second pixels in the second liquid crystal display panel are the same.

9. The liquid crystal display device according to claim 8, wherein the second liquid crystal display panel is disposed near a back face side of the first liquid crystal display panel; and in the first mode, the second liquid crystal display panel functions as an active backlight for the first liquid crystal display panel.

10. The liquid crystal display device according to claim 1, wherein any one of the first color, the second color and the third color is red, one of the other colors is green, and the remaining color is blue.

\* \* \* \* \*